(12) United States Patent
LeCompte

(10) Patent No.: US 9,538,426 B2
(45) Date of Patent: *Jan. 3, 2017

(54) HEADER COMPRESSION OPTIMISATION METHOD DURING AND AFTER HANDOVERS IN CELLULAR COMMUNICATION NETWORK

(71) Applicant: NEC Corporation, Tokyo (JP)

(72) Inventor: David LeCompte, Maisons-Alfort (FR)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,744

(22) Filed: Dec. 14, 2015

(65) Prior Publication Data

US 2016/0105823 A1 Apr. 14, 2016

Related U.S. Application Data

(63) Continuation of application No. 14/336,264, filed on Jul. 21, 2014, now Pat. No. 9,246,832, which is a (Continued)

(30) Foreign Application Priority Data

Oct. 10, 2005 (EP) .................................. 05109404

(51) Int. Cl.
*H04W 36/00* (2009.01)
*H04W 28/06* (2009.01)
(Continued)

(52) U.S. Cl.
CPC .......... *H04W 36/0011* (2013.01); *H04L 47/38* (2013.01); *H04L 69/04* (2013.01);
(Continued)

(58) Field of Classification Search
CPC ............... H04W 36/011; H04W 28/06; H04W 28/0226; H04W 28/18; H04W 36/06; H04W 80/00; H04W 80/04; H04W 84/042; H04L 69/04; H04L 69/16; H04L 69/22; H04L 69/161; H04L 47/38; H04L 67/2828

See application file for complete search history.

(56) References Cited

U.S. PATENT DOCUMENTS 6,300,887 B1 * 10/2001 Le .......................... H04L 29/06
341/60
7,539,130 B2 5/2009 Le et al.
(Continued)

FOREIGN PATENT DOCUMENTS

JP 2003-224610 8/2003
JP 2004-517514 6/2004
(Continued)

OTHER PUBLICATIONS

"Channel State Dependent Robust TCP/IP Header Compression for 3G Wireless Networks", Y. Wu et al, IEEE, 2004.*
(Continued)

*Primary Examiner* — Habte Mered
(74) *Attorney, Agent, or Firm* — Finnegan, Henderson, Farabow, Garrett & Dunner LLP

(57) ABSTRACT

The present invention concerns a method for optimizing ROHC RTP (Robust Header Compression Real Time Protocol) compression applied to IP header of data packets stream so as to use more compact formats enable to remain in a steady state, to never discard received packet, and serve radio resources without requiring to modify ROHC specification. In the method, when handover or mobility procedure is stated, new reference values are normally added to a sliding compression window, but no reference value is removed from the window as long as the handover or mobility procedure is ongoing. After the handover or mobility procedure is complete, when the number of values (Continued)

transmitted on the new radio link are appropriate to cope against the error properties on the new link, all older values can be removed at once from the compression window, thereby reverting to normal window operation.

2 Claims, 3 Drawing Sheets

Related U.S. Application Data continuation of application No. 13/403,171, filed on Feb. 23, 2012, now Pat. No. 8,817,748, which is a continuation of application No. 12/089,758, filed as application No. PCT/JP2006/320356 on Oct. 5, 2006, now Pat. No. 8,218,499.

(51) Int. Cl.
*H04L 29/06* (2006.01)
*H04L 12/811* (2013.01)
*H04W 28/02* (2009.01)
*H04W 28/18* (2009.01)
*H04W 36/08* (2009.01)
*H04W 80/00* (2009.01)
*H04W 80/04* (2009.01)
*H04W 84/04* (2009.01)
*H04L 29/08* (2006.01)

(52) U.S. Cl.
CPC ............ *H04L 69/16* (2013.01); *H04L 69/161* (2013.01); *H04L 69/22* (2013.01); *H04W 28/0226* (2013.01); *H04W 28/06* (2013.01); *H04L 67/2828* (2013.01); *H04W 28/18* (2013.01); *H04W 36/08* (2013.01); *H04W 80/00* (2013.01); *H04W 80/04* (2013.01); *H04W 84/042* (2013.01)

(56) References Cited

U.S. PATENT DOCUMENTS

| | | |
|---|---|---|
| 2002/0018010 A1 | 2/2002 | Le |
| 2003/0156559 A1 | 8/2003 | Yi et al. |
| 2004/0264433 A1 | 12/2004 | Melpignano |
| 2005/0265383 A1* | 12/2005 | Melpignano .......... H04L 1/0014 370/465 |
| 2007/0274317 A1 | 11/2007 | Pelletier et al. |

FOREIGN PATENT DOCUMENTS

| | | |
|---|---|---|
| JP | 2004-517580 | 6/2004 |
| WO | WO 02/11397 A1 | 2/2002 |

OTHER PUBLICATIONS

International Search Report for PCT/JP2006/320356, mailed Dec. 26, 2006.
Japanese Office Action for JP2008-506885 issued Nov. 8, 2011.
Bormann, et al., RFC 3095: Robust Header Compression (ROHC): Framework and four profiles: RTP, UDP, ESP, and uncompressed, Jul. 2001, Network Working Group, pp. 1-169.

* cited by examiner

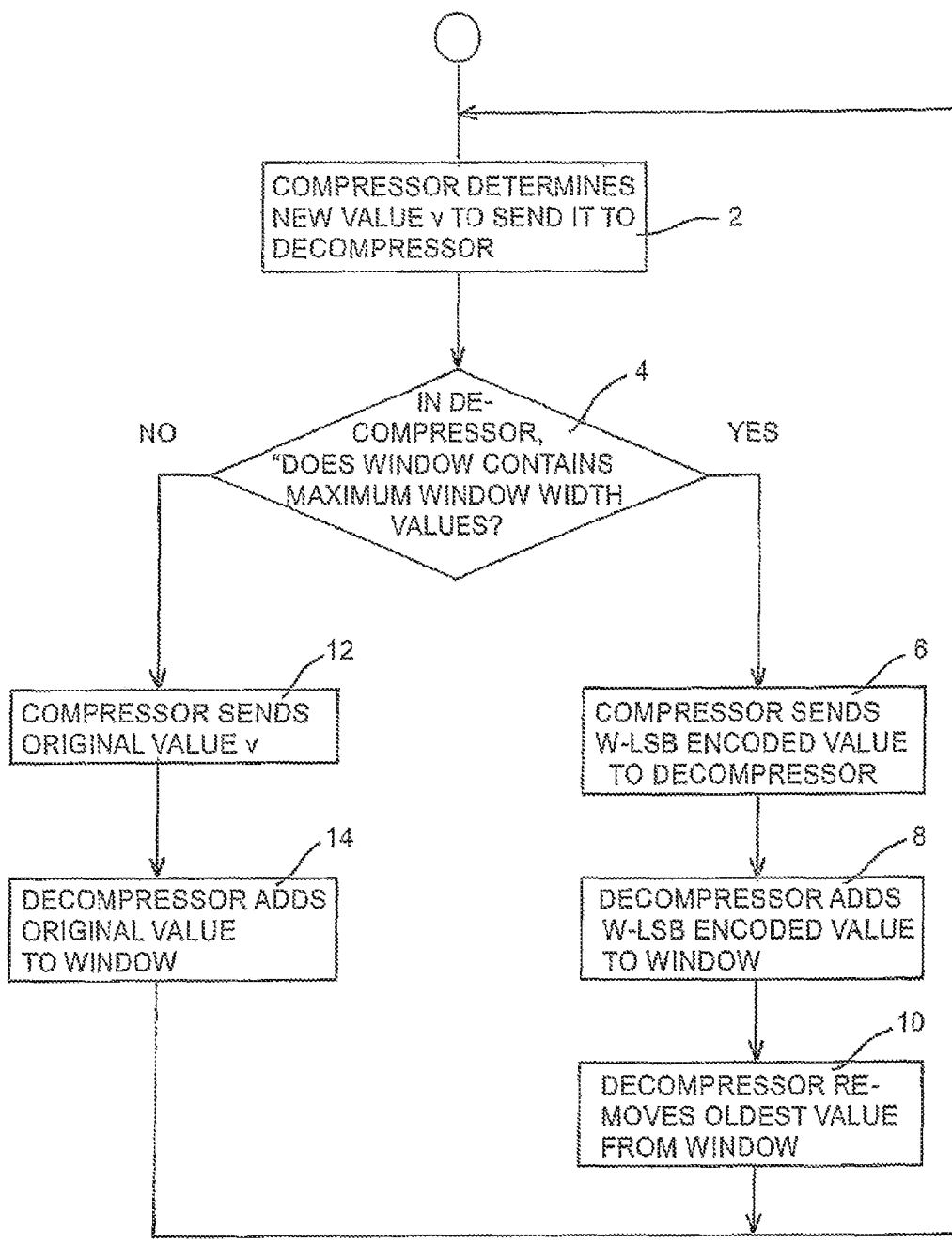

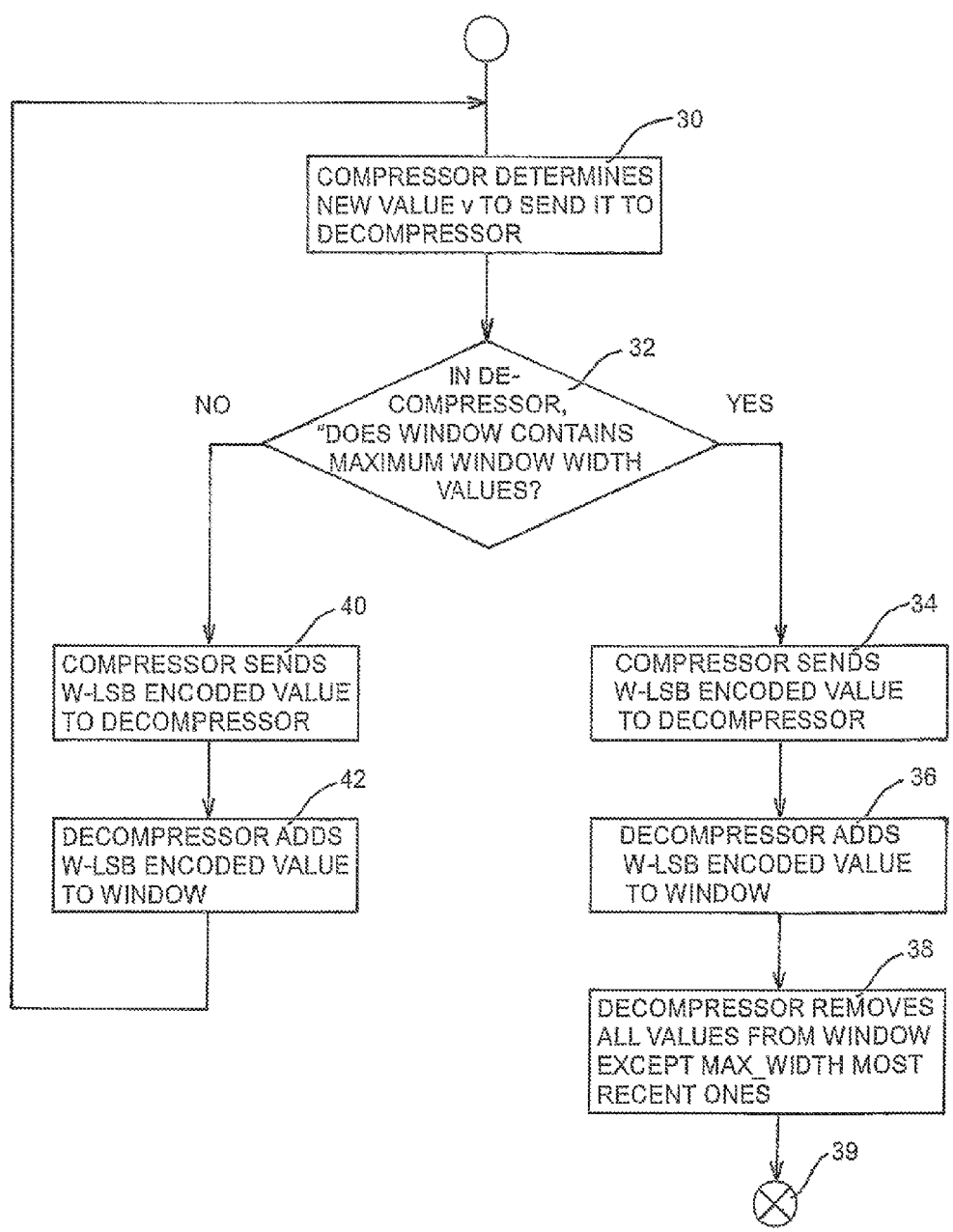

HEADER COMPRESSION OPTIMISATION METHOD DURING AND AFTER HANDOVERS IN CELLULAR COMMUNICATION NETWORK

REFERENCE TO RELATED APPLICATIONS

This application is a continuation of U.S. application Ser. No. 14/336,264, filed on Jul. 21, 2014, which is a continuation of application Ser. No. 13/403,171, filed on Feb. 23, 2012, (now U.S. Pat. No. 8,817,748, issued on Aug. 26, 2014), which is a continuation of application Ser. No. 12/089,758, filed on Apr. 10, 2008, (now U.S. Pat. No. 8,218,499, issued on Jul. 1, 2012), which is a National Stage Entry of International Application No. PCT/JP2006/320356, filed on Oct. 5, 2006, which claims priority from European Patent Application No. 05109404.3, filed on Oct. 10, 2005. The contents of the above-referenced applications are expressly incorporated herein by reference.

TECHNICAL FIELD

The present invention pertains to telecommunication field and concerns a method of optimizing IP (Internet Protocol) Header Compression of data packets stream exchanged between a first mobile terminal camping on a cell in a cellular communication network and a second terminal connected to Internet.

The method comprises the steps of:
encoding the IP header field, and
exchanging between the first mobile terminal and the second terminal a compression window comprising at least one reference value used by the first mobile terminal (respectively the second terminal) for compression and to be used by the second terminal (respectively the first terminal) for decompression.

The second terminal may be either a mobile terminal or a specific node of the cellular communication network.

The invention concerns as well a mobile terminal adapted for implementing the method.

STATE OF PRIOR ART

Today, IP telephone is gaining momentum thanks to improved technical solutions. In the years to come, IP will become a commonly used way to carry telephone. Some future cellular telephony links might also be based on IP and IP telephony. Cellular phones may have IP stacks supporting not only audio and video, but also web browsing, e-mail, gaming, etc.

A problem with IP over cellular links when used for interactive voice conversations is the large header overhead. Speech data for IP telephony will most likely be carried by RTP (Real-Time Protocol). A packet will then, in addition to link layer framing, have an IPv4 header (20 octets), a UDP (User Datagram Protocol) header (8 octets), and an RTP (Real-Time Protocol) header (12 octets) for a total of 40 octets. With IPv6, the IP header is 40 octets for a total of 60 octets. The size of the payload depends on the speech coding and frame sizes being used and may be as low as 15-20 octets.

Robust Header Compression (ROHC) was created to overcome the limitation of IPHC (IP Header Compression) and the RFC2507 specification of 3GPP for the use on cellular links which usually suffer high error rates and large transmission delay. ROHC is designated to enable taking into account the error rate of transmission link while performing header compression, so as to ensure the success of decompression of headers that were transmitted through this link. This is why ROHC is adapted to the use on radio link.

However, during handover procedures in a cellular communication network, such as intra-RNC (Radio Network Controller) hard handover and inter-RNC hard handover (combined hard handover and SNRS relocation with context relocation) in UMTS (Universal Mobile Telecommunication System an unusually long sequence of consecutive packets can be lost, which is likely to cause decompression failures, packet losses, and partial re-initialization of compression context using large headers (IR-DYN format, 15 bytes), so degraded compression efficiency.

It is therefore desirable to enhance the performance of the header compression scheme to cope with the above-described problem during handover procedure.

Such performance can be described with three parameters: compression efficiency, robustness, and compression transparency. A robust scheme tolerates loss and residual errors on the link over which header compression takes place without losing additional packets or introducing additional errors in decompression headers.

FIG. 1 illustrates one of ROHC's main principles for compression is W-LSB (Window-base Least Significant Bit) encoding.

If a value v is an encoded value on k bits, the LSB (Least Significant Bit) encoded value e ranges between 0 and $2^k-1$, "e" is the rest of the integer division of v by $2^k$, also written $e=y[2^k]$.

If the decompressor uses a reference value $v_{ref}$ (previously received not encoded or decompressed) to determine v from e, it picks up only the value v in the interval $f(v_{ref}, k)$ so that $e=y[2^k]$. The value is unique because the interval is of size $2^k$.

If the compressor has chosen k large enough so that there is a set of reference values $v_i$ so that a value v is in the interval $f(v_i, k)$ for each $v_i$, i.e., v is in the intersection of these intervals, and then whichever single one of the $v_i$ values is used as a reference, there is a unique value v so that $e=y[2^k]$.

FIG. 1 illustrates an example with three reference values $v_1$, $v_2$ and $v_3$. Normal behavior of the ROHC compressor in U and O-mode (Optimistic mode) is, for each value, to choose k large enough so that, using any of the n previously sent values as a reference, the result of decompressing this value between 0 and $2^k-1$ will be the original value. The set of "n" previously sent values is usually called the "window" and n is called the "maximum window width". n is chosen according to the probability of loosing a packet and/or receiving an incorrect packet, so that the probability of loosing n consecutive reference values is low enough.

Appropriate robustness is obtained by keeping a sufficient number of reference values in the compressor window to cope with possible losses or errors according to transmission link properties.

In the header compression technique, described in RFC 3095 of the 3GPP, the scheme is guaranteed to be correct if the compressor and the decompressor each use interpretation intervals:
in which the original value resides; and
in which the original value is only the value that has the exact same k least significant bits as those transmitted.

The interpretation interval is described as the following function f(v_ref, k).

$$f(v\_ref, k) = [v\_ref-p, v\_ref+(2^k-1)-p]$$

where p is an integer.

The function f has the following property: for any value k, the k least significant bits will uniquely identify a value in $f(v\_ref, k)$.

The parameter p is introduced so that the interpretation interval can be shifted with respect to v_ref choosing a good value for p will yield a more efficient encoding for fields with certain characteristics.

When compressing a value v, the compressor finds the minimal value of k such that v falls into the interval $f(v\_ref\-c, k)$. Call this function $k=g(v\_ref\_c, v)$.

When only a few distant value of k are possible, for example, due to limitations imposed by packet formats, the compressor will instead pick the smallest k that puts v in the interval $f(v\_ref\-c, k)$.

When receiving m LSBs, the decompressor uses the interpretation interval $f(v\_ref\-d, m)$, called interval_d. It picks as the decompressed value the one in interval_d whose LSBs match the received m bits.

The compressor may not be able to determine the exact value of v_ref_d that will be used by the decompressor for a particular value v, since some candidates for v_ref_d may have been lost or damaged. However, by using feedback or by making reasonable assumptions, the compressor then calculates a number k of candidates such that no matter which v_ref_d in the candidate set the decompressor uses, v is covered by the resulting interval_d.

Since the decompressor always uses as the reference the last received value where a CRC (Cycle Redundancy Check) succeeded, the compressor maintains a sliding window containing the candidates for v_ref_d.

This sliding window is initially empty. The following operations are performed on the sliding window by the compressor:

After sending a value v (compressed or uncompressed) protected by a CRC, the compressor adds v to the sliding window.

For each value v being compressed, the compressor chooses $k=max(g(v\_min, v), g(v\_max, v))$, where v_min and v_max are the minimal and maximum values in the sliding window, and g is function defined above.

When the compressor is sufficiently confident that a certain value v and all values older than v will not be used as reference by the decompressor, the window is advanced by removing those values (including v).

The confidence may be obtained by various means.

In R-mode (Bidirectional Reliable mode), an ACK (Acknowledge) signal from the decompressor implies that values older than the acknowledged one can be removed from the sliding window. In U/O-modes (Unidirectional/Optimistic modes), there is always a CRC to verify correct decompression, and a sliding window with a limited maximum width is used.

The window width is an implementation dependent optimization parameter. The decompressor follows the procedure described in the previous section, except that in R-mode where it must acknowledge each header received with a succeeding CDC.

As seen above, in conventional ROHC operations, when a new value is transmitted, it is added to the window, and the oldest value is removed from the window. This may create difficulties for the decompressor when an intersystem or intercellular handover procedure occurs. In fact, during the handover procedure, an unusually large number of consecutive packets can be lost. This situation can result in synchronization to be lost, a negative acknowledgement indication to be sent back to the compressor, and all received packets to be discarded until the compressor has reversed to the second step of the initialization phase. Consequently, it might result in future loss of synchronization, or to spontaneously fallback in the initialization phase, using the IR-DYN format, around 15-bytes long, to avoid the round-trip delay of the negative feedback indication during which all received packets are discarded.

Currently existing improvements for ROHC compressor are either to change behavior in a way which is not compatible with normal ROHC behavior as in 3GPP 25.323 which proposes to in O-mode to "not update the context", which is impossible according to ROHC specification.

An object of the present invention is to adapt the sliding compression window when a handover procedure occurs.

Another object of the present invention is to keep compression during the handover procedure.

Still another object of the present invention is to use the smallest possible compressed format according to handover duration, and to not use the large IR-DYN packet format as currently specified by 3GPP.

DISCLOSURE OF THE INVENTION

The present invention is intended to improve the technique for compressing IP header files of an IP packet stream exchanged over cellular links between a first mobile terminal camping on a cell in a cellular communication network and a second mobile terminal of a specific in the cellular communication network. The specific node is, for example, the Radio Network Controller RNC for a UMTS network or the SGSN (Serving GPRS) for a GSM network.

According to the present invention, when handover or mobility procedure is started, new reference values, i.e., values which are transmitted in a header format so that a decompressor will use it for future decompression, are normally added to a sliding compression window, but no reference value is removed from the window as long as the handover or mobility procedure is ongoing. This permanently enlarges the window while the handover or mobility procedure is ongoing.

Further, when the number of rattles transmitted on the new radio link, i.e., after the handover or mobility procedure is complete, are appropriate to cope against the error properties on the new link, all older values can be removed at once from the compression window, thereby reverting to normal window operation.

The above described objects of "the present invention are achieved by a method for optimizing ROHC RTP (Robust Header Compression Real Time Protocol) compression applied to IP header of data packets stream exchanged between a first mobile terminal camping on a cell in a cellular communication network and a second terminal connected to Internet, the method comprising the steps of:

encoding the IP header field, and exchanging between the first mobile terminal and the second terminal a compression window comprising at least one reference value used by the first mobile terminal (respectively the second terminal) for compression and to be used by the second terminal (respectively the first terminal) for decompression, the method characterized by further comprising the steps of:

when a handover or mobility procedure is started, adding at least one new reference value to the compression window for the subsequent decompression without removing the previous reference values from the window as long as the handover or mobility procedure is ongoing, and after the handover or mobility procedure is complete, removing all previous values at once from the compression window.

According to a preferred embodiment of the present invention, the ROHC RTP compression uses Window-based Least Significant Bit encoding (W-LSB).

The above described method of the present invention is implemented in a mobile terminal camping on a cell in a cellular communication network and exchanging data packets stream with a second terminal in the cellular communication network, the mobile terminal comprising a compressor and a decompressor, means for encoding the IP header field, and means for exchanging between the first mobile terminal and the second terminal a compression window comprising at least one reference value used by the first mobile terminal for compression and to be used by the second terminal for decompression, the mobile terminal characterized by further comprising:
means for adding at least one new reference value to the compression window for the subsequent decompression when a handover or mobility procedure is started, without removing the previous reference values from the window as long as the handover or mobility procedure is ongoing, and means for removing all previous values at once from the compression window after the handover or mobility procedure is complete.

Thus, the present invention enables to use more compact formats, depending on handover duration, from UO-0 3 bytes, enables to remain in the steady state, to never discard received packets, it also saves radio resources and does not require to modify ROHC specification.

In addition, RAN2 is currently defining optimized Radio Access Bearers (RABs) for voice over IMS with the assumption to have 2 RAB definitions, one for each ROHC phase, and use RRC signaling to switch between two. Avoiding fallback to initialization phase can therefore also save RRC signaling.

BRIEF DESCRIPTION OF THE DRAWINGS

FIG. 2 illustrates a flow chart of normal behavior of ROHC compressor according to the present invention in U- and O-modes (Unidirectional and Optimistic modes).

FIG. 4 illustrates a flow chart of behavior of ROHC compressor according to the present invention after the handover or mobility procedure is complete.

BEST MODE FOR CARRYING OUT THE INVENTION

Figure 1:
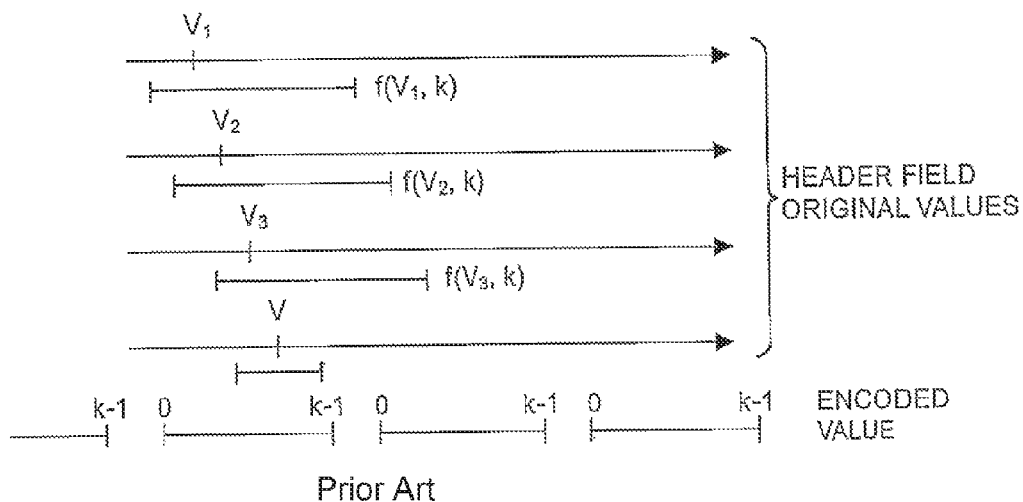
FIG. 1 illustrates one of ROHC's (Robust Header Compression) main principle in the prior art.

The following description is made in the case where the IP header value to be compressed is either the RTP Timestamp (Real Time Protocol Timestamp) or the RTP Sequence Number (Real Time Protocol Sequence Number) of a packet data stream transmitted from a first cellular mobile terminal to a second cellular mobile terminal during a handover or mobility procedure in a cellular communication network. Both mobile terminals comprises a compressor and a decompressor adapted for implementing the optimized method according to the present invention.

The context of the compressor is the state that it uses to compress a header. The context of the decompressor is the state that it uses to decompress a header. Either of these or the two I combinations are usually referred to as "context". The context contains relevant information from previous headers in the packet stream, such as static fields and possible reference values for compression and de compression. Moreover, additional information describing the packet stream is also part of the context, for example, information about how the IP identifier field changes and the typical inter-packet increase in sequence number or timestamps.

Let us call $(x_n)$, with n between 0 and an undetermined large number, the sequence of values for one of the RTP (Real Time Protocol) header fields to be W-LSB (Window-based Least Significant Bit) encoded. Assume the encoding window contains k values, $(w_1, \ldots, w_k)$.

If $g(v_{ref}, x_n)$ is the minimal number of bits to encode $x_1$ according to reference value $v_{ref}$ i.e., the minimal number of bits necessary to properly reconstruct the original value using $v_{ref}$, then the minimal number of bits to encode $x_i$ according to the all reference values in the encoding window is $\text{Max}_{(k=0 \text{ to } k)} g(w_i, x_n)$. Encoding $x_n$ according to all reference values means using at least this number of bits for $x_n$ in the ROHC packet where it is transmitted. In conventional ROHC O-mode (Optimistic mode) operation, when a new value is transmitted, it is added to the window, and the oldest valve is removed from the window, i.e., if the compressor uses:

$(x_0, x_1, \ldots, x_{n-k}, \ldots, x_{n-1}, x_n, \ldots)$ to encode $x_n$, and then the window is updated to be $(x_0, x_1, \ldots, x_{n-k}, \ldots, x_{n+1-k}, \ldots, x_{n-1}, x_n, x_{n+1}, \ldots)$ to encode $x_{n+1}$, and then the window is updated to be $(x_0, x_1, \ldots, x_{n-k}, x_{n+1-k}, x_{n+2-k}, \ldots x_{n-1}, x_n, x_{n+1}, x_{n+2}, \ldots)$ and so on.

When operating in O-mode over a regular voice/IP stream, only 4 bits of timestamp needs transmission, i.e., the UO-0 packet format can be used, which is 3 bytes for each header including 2 bytes UDP checksum.

When handover or mobility procedure is started, it is proposed to update the window differently. If $x_s$ is the first value to be sent after mobility is started, the compressor uses:

$(x_0, x_1, \ldots, x_{s-k}, \ldots, x_{s-1}, x_s, \ldots)$ to encode $x_s$ and then the window is updated to be $(x_0, x_1, \ldots, x_{s-k}, \ldots, x_{s-1}, x_s, x_{s+1}, \ldots)$ to encode $x_{s+1}$ and then the window is updated to be $(x_0, x_1, \ldots, x_{s-k}, \ldots, x_{s-1}, x_s, x_{s+1}, x_{s+2}, \ldots)$ and so on.

In other words, when a new value is transmitted during handover or mobility procedure, no old reference value is removed from the sliding window as the new one is added, and the number of values in the window is increased by one for each transmitted values.

The ROHC compressed packet size is determined as following: as the number of reference values in the sliding window increases, more bits of SN needs to be transmitted (around $2^{window\ size}$), and the ROHC packet header formats are, depending on the number of values in the window:

up to 16: UO-0 (3 bytes long, including 4 bits of SN)
up to 64: UO-2 (5 bytes long, including 6 bits of SN)
up to 512: UO-2 extension 0 (6 bytes long, including 9 bits of SN)

The packet compressed during the handover or mobility procedure might not be transmitted, but what matters are that the ROHC, compressor is updated to properly compress packets after handover or mobility completion.

When handover or mobility procedure is complete, it becomes possible to send compressed values according to the sliding window, and update it in the same way. If $x_s$ is the first value to be transmitted after end of handover or mobility procedure and m is the number of values in the sliding window to ensure proper operation on the new radio link according to its error properties, it is proposed to wait until $x_s$ can be removed from the sliding window to remove all older values (indicated in italics) from the window at the same time, i.e., the compressor uses:

$(x_0, x_1, \ldots, x_{s-k}, \ldots, x_{s-1}, x_e, \ldots)$ to encode xe, and then the window is updated so as to be $(x_0, x_1, \ldots, x_{s-k}, \ldots, x_{s-1}, x_e, x_{e+1}, \ldots)$ to encode $x_{e+1}$, and then the window is updated so as to be $(x_0, x_1, \ldots, x_{s-k}, \ldots, x_{s-1}, x_e, x_{e+1}, x_{e+2}, \ldots)$ and so on until the window becomes $(x_0, x_1, \ldots, x_{s-k}, \ldots, x_{s-1}, x_e, x_{e+1}, x_{e+2}, \ldots, x_{e+m-2}, x_{e+m-1}, \ldots)$ to encode $x_{e+m-1}$.

The compressed packet size is described as above, but are really transmitted.

Then, the window is updated to:

$(x_0, x_1, \ldots, x_{s-k}, \ldots, x_{s-1}, x_e, x_{e+1}, x_{e+2}, \ldots, x_{e+m-2}, x_{e+m-1}, \ldots)$ to encode $x_{e+m-1}$ $(x_0, x_1, \ldots, x_{s-k}, \ldots, x_{s-1}, x_e, x_{e+1}, x_{e+2}, \ldots, x_{e+m-2}, x_{e+m-1}, x_{e+m}, \ldots)$ to encode $x_{e+m}$.

The sliding window has then the usual form when no handover or mobility procedure occurs, and the compressed packet size is reversed to 3 bytes (UO-0 format).

With the method of the present invention, for a typical voice/IP call using an AMR codec which yields 1 frame every 20 ms, a 1 second handover could be handled with 5 bytes headers and a less than 5 seconds handover with 6 bytes headers, rather than with IR-DYN headers0 (15 bytes) as currently specified by 3GPP.

Normal behavior of the ROHC compressor in U- and O-modes (Unidirectional and Optimistic modes) is illustrated in FIG. 2.

In FIG. 2, at step 2, the compressor determines the new value v to send it to the decompressor, at step 4, the decompressor verifies if the window contains the maximum window width values.

If the window contains Max_width values, the compressor sends a W-LSB encoded value at step 6. At step 8, the decompressor adds said value to the window, and the de compressor removes the oldest value from the window at step 10.

Else, at step 12, the compressor sends the original value v, and the decompressor adds the value to the window at step 14.

Figure 3:
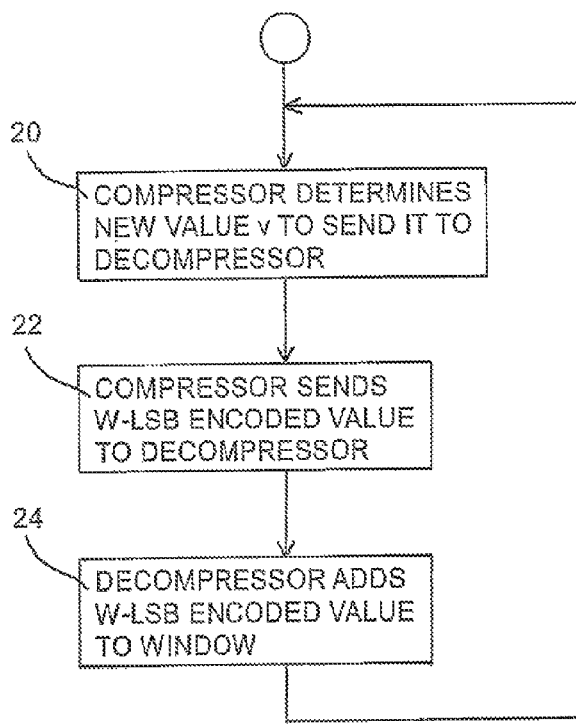
FIG. 3 illustrates a flow chart of behavior of ROHC compressor according to the present invention when a handover or mobility procedure is initiated.

Referring now to FIG. 3 illustrating the case when there are max_width values in the window and when a handover or mobility procedure is initiated.

In this situation, as illustrated in FIG. 3, at step 20, the compressor determines the new value v to send it to the decompressor. In the meanwhile, W-LSB encode the new value. The compressor sends the W-LSB encoded value to the decompressor at step 22. At step 24, the decompressor adds the W-LSB encoded value to the window and the optimization procedure is restarted from the step 20.

As shown in FIG. 3, the oldest value is not removed from the window during the handover or mobility procedure.

FIG. 4 illustrates the method according to the present invention after the handover or mobility is complete. In FIG. 4, at step 30, the compressor determines the new value v to send it to the decompressor. At step 32, the decompressor verifies if the window contains the maximum window width values that were transmitted after the handover or mobility procedure is complete.

If the window contain Max_width values, the compressor send the W-LSB encoded value to the decompressor at step 34. At step 36, the decompressor adds the W-LSB encoded value to the window, and the decompressor removes all values from the window except the Max-width most recent ones at step 38, and normal procedure is resumed at step 39.

Else, at step 40 in FIG. 4, the compressor sends the W-LSB encoded value to the decompressor, and at step 42, the decompressor adds the W-LSB encoded value to the window and restarts the optimization procedure from step 30.

According to the present invention, as illustrated in FIG. 4, Max width is set according to the error rate of the link after the handover or mobility. It could be different if the new link has different error properties than the old one.

What is claimed is:

1. A mobile station which communicates with a communications apparatus, the mobile station comprising:
   a memory storing instructions; and
   one or more processors configured to execute the instructions to:
      receive an indication about mobility; and
      upon reception of said indication, update, for Window-based Least Significant Bit (W-LSB) encoding, a set of candidate reference values used by a decompressor by adding new values for transmission but not removing old values.

2. A communications control method in a mobile station which communicates with a communications apparatus, the communications control method comprising:
   receiving an indication about mobility; and
   upon reception of said indication, updating, for Window-based Least Significant Bit (W-LSB) encoding, a set of candidate reference values used by a decompressor by adding new values for transmission but not removing old values.

* * * * *